United States Patent
Otani

(10) Patent No.: US 11,641,431 B2
(45) Date of Patent: May 2, 2023

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Hiroshi Otani, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/679,704

(22) Filed: Feb. 24, 2022

(65) Prior Publication Data

US 2022/0294913 A1  Sep. 15, 2022

(30) Foreign Application Priority Data

Mar. 10, 2021  (JP) .............................. JP2021-038214

(51) Int. Cl.
*H04N 1/00* (2006.01)

(52) U.S. Cl.
CPC ....... *H04N 1/00137* (2013.01); *H04N 1/0092* (2013.01); *H04N 1/00145* (2013.01); *H04N 1/00188* (2013.01)

(58) Field of Classification Search
CPC ........... H04N 1/00137; H04N 1/00143; H04N 1/00145; H04N 1/00188; H04N 1/00915; H04N 1/0092; G06F 3/1263
USPC ....................................................... 358/1.15
See application file for complete search history.

(56) References Cited

U.S. PATENT DOCUMENTS 7,265,855 B2 * 9/2007 Patton ................... G06F 3/1286
                                                     358/437
11,249,693 B2 * 2/2022 Kumahashi ........... G06F 3/1275

FOREIGN PATENT DOCUMENTS

JP  2005-346380 A  12/2005
JP  2018-195039 A  12/2018

* cited by examiner

*Primary Examiner* — Kent Yip
(74) *Attorney, Agent, or Firm* — Studebaker & Brackett PC

(57) ABSTRACT

Both a transmission priority of order data and a reception priority of product data can be controlled based on a usage status of a bandwidth of a network.

In an image processing apparatus, an image processing method, a program, and a recording medium according to an embodiment of the present invention, product data is created based on order data received via a network. A transfer priority of current data over preceding data is determined based on a determination condition of transfer priorities, and control is performed such that the preceding data and the current data are transferred according to the transfer priorities. The transfer priorities are changed such that the transfer of the preceding data is interrupted and the transfer of the current data is started in a case where the transfer priority of the preceding data is lower than the transfer priority of the current data and the usage status of the bandwidth of the network due to the transfer of the preceding data is equal to or greater than a threshold value.

20 Claims, 7 Drawing Sheets

IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2021-038214, filed on Mar. 10, 2021. The above application is hereby expressly incorporated by reference, in its entirety, into the present application.

BACKGROUND OF THE INVENTION

1. Field of the Invention

The present invention relates to an image processing apparatus, an image processing method, a program, and a recording medium for editing and creating print products such as a postcard, a photographic print, and a photo book on a server on a cloud.

2. Description of the Related Art

In an image processing apparatus of the related art for creating a print product, an order receiving machine (storefront machine) installed in a store such as a photo shop has an image processing function for editing the print product and creating a final print product. The print product is printed in the store, or product data of the final print product after image processing is transmitted to a print laboratory via a network, and the print product is printed in the print laboratory.

In this case, for example, in a case where the image processing function of the order receiving machine is updated in order to improve the image processing function, software for updating the image processing function needs to be transmitted to each store, and a clerk of each store needs to update the image processing function. Alternatively, a worker is dispatched to each store to update the image processing function, but cost is required. Thus, the image processing apparatus cannot be used during the update of the image processing function. A high-performance and expensive device capable of performing image processing is required as the order receiving machine.

Here, the related arts related to the present invention include, for example, JP2005-346380A and JP2018-195039A.

JP2005-346380A describes a digital photo order processing system in which order data including order information and order images is transmitted from an ordering terminal to a center server via the Internet, the order information of the order data included in the order data is preferentially transferred from the center server to a photo laboratory via the Internet, and the order images included in the order data are transferred to the photo laboratory via the Internet after the transfer of the order information.

JP2018-195039A describes a data communication system in which while a plurality of files are being uploaded by one client device among a plurality of client devices, in a case where a request to browse a file that is not uploaded among the plurality of files is given to a data management server from another client device, a predetermined sequence is changed such that the file requested to be browsed from another client device is preferentially uploaded to one client device.

SUMMARY OF THE INVENTION

In order to solve the problem of the image processing apparatus of the related art, it is considered that a cloud-type kiosk terminal is used. In this case, the order receiving machine receives, for example, order data corresponding to an order of a user and transmits the order data to a server on a cloud via a network. On the other hand, the server edits print product corresponding to the order data, creates product data of a final print product, and transmits the product data to the store or the print laboratory. In the store or the print laboratory, a print product corresponding to the product data is printed.

As a result, in a case where the image processing function is updated, since it is necessary to update only the image processing function of the server, a burden on the clerk of each store can be reduced, and the cost can be reduced. For example, the order receiving machine can display an editing screen for causing the server to perform image processing on a display screen of a web browser, and can transmit the order data and receive the product data. However, since it is not necessary to perform the image processing, high-performance and expensive apparatus is not required, and the cost can be reduced.

However, in the image processing apparatus using the cloud-type kiosk terminal, in order to create the print product, since the store transmits the order data to the server on the cloud and the server receives the product data to the store or the print laboratory, a network load is heavier than the order receiving machine of the related art. There is no problem in a case where there is room in the bandwidth of the network, but congestion occurs in the transmission of the order data and the reception of the product data in a case where there is no room. In this case, for example, in the store, there is a problem that a waiting time of the user who receives the print product becomes long.

A transfer speed is uniquely determined in a case where a combination of a transmission side and a receiving side is determined. However, for example, even in a best effort optical line of which a nominal speed is 1 gigabit per second (Gbps), an effective speed may be only 2 to 3 megabits per second (Mbps) in some regions and time zones. Thus, in the image processing apparatus using the cloud-type kiosk terminal, the efficient use of the network is indispensable.

JP2005-346380A controls a priority only in a case where the order data is transferred (downloaded) from the center server to the photo laboratory, and JP2018-195039A controls the priority only in a case where the file is uploaded from the client device to the data management server. As described above, in the image processing apparatus of the related art for creating the print product, the transfer priority is controlled for only one of download or upload regardless of the usage status of the bandwidth of the network.

An object of the present invention is to provide an image processing apparatus, an image processing method, a program, and a recording medium capable of controlling both a transmission priority of order data and a reception priority of product data based on a usage status of a bandwidth of a network.

In order to achieve the object, the present invention provides an image processing apparatus including a first processor, and a second processor. The first processor receives, as an input, order data including a print product material and image data of an image to be applied to the print product material, the second processor creates product data of a print product in which the image data is applied to the print product material based on the order data received from the first processor via a network, determines a transfer priority of current data including product data or order data of a current order over preceding data including product data or order data of a preceding order based on a determination condition of transfer priorities, performs control such that the preceding data and the current data are transferred according to the transfer priorities, and changes the transfer priorities such that the transfer of the preceding data is interrupted and the transfer of the current data is started in a case where a transfer priority of the preceding data is lower than the transfer priority of the current data and a usage status of a bandwidth of the network due to the transfer of the preceding data is equal to or greater than a predetermined threshold value.

Here, it is preferable that the second processor determines the transfer priority of the current data over the preceding data based on a type of the print product material, the number of images, and a capacity of the image data included in the current data, a target finish time of the print product set for each type of the print product materials, operation logs of usage statuses of bandwidths of the network in a store and a print laboratory, and a transfer status and the transfer priority of the preceding data.

It is preferable that the second processor further determines the transfer priorities such that a transfer priority of order data or product data corresponding to a print product printed by a printer of the store is higher than a transfer priority of order data or product data corresponding to a print product printed by a printer of the print laboratory.

It is preferable that the second processor determines the transfer priorities such that a transfer priority of order data or product data corresponding to a print product for a first target finish time is higher than a transfer priority of order data or product data corresponding to a print product for a second target finish time longer than the first target finish time.

It is preferable that the second processor further determines the transfer priorities such that, among print products printed by a printer of the print laboratory, a transfer priority of product data corresponding to a print product directly delivered to the store or a user from the print laboratory is higher than a transfer priority of product data corresponding to a print product forwarded to a delivery base from the print laboratory and delivered to the store or the user from the delivery base.

It is preferable that the second processor further determines the transfer priorities such that, among print products printed by a printer of the print laboratory, a transfer priority of order data or product data corresponding to a print product for which a speedy-finishing is designated is higher than a transfer priority of order data or product data corresponding to a print product for which the speedy-finishing is not designated.

It is preferable that the second processor determines the transfer priorities so as to be the same as sequences in which orders are performed in a case where it is determined that the transfer priority of the current data and the transfer priority of the preceding data are the same priority.

It is preferable that the second processor further determines the transfer priorities such that a transfer priority of order data or product data corresponding to a print product printed by a waiting printer is higher than a transfer priority of order data or product data corresponding to a print product printed by an operating printer based on operation logs of usage statuses of printers of the store.

It is preferable that the second processor determines the transfer priorities such that a transfer priority of order data or product data corresponding to a first print product material for which the number of prints with respect to the number of images transferred is larger than a second print product material is higher than a transfer priority of order data or product data corresponding to the second print product material.

It is preferable that the second processor further determines the transfer priorities such that a transfer priority of order data or product data corresponding to a third print product material for which the number of orders in a specific period is larger than a fourth print product material is higher than a transfer priority of order data or product data corresponding to the fourth print product material.

It is preferable that the second processor determines the transfer priorities such that a transfer priority of order data or product data corresponding to a print product printed by a printer of the print laboratory is the lowest in a specific time zone of a current specific day of the week in a case where a usage status of a bandwidth of the network in a specific time zone of a past specific day of the week is equal to or greater than a threshold value based on an operation log of the usage status of the bandwidth of the network in the specific time zone of the past specific day of the week.

It is preferable that the second processor divides the image data and transfers the divided image data in at least one of a case where a capacity of the image data is equal to or greater than a threshold value or a case where a delay time of the network is equal to or greater than a threshold value.

It is preferable that the second processor determines an upper limit of the bandwidth of the network used at a time of transferring the image data and transferring the image data in a case where a capacity of the image data is equal to or greater than a threshold value.

The present invention provides an image processing method including a step of receiving, by an order receiving unit, as an input, order data including a print product material and image data of an image to be applied to the print product material, a step of creating, by an order processing unit, product data of a print product in which the image data is applied to the print product material based on the order data received from the order receiving unit via a network, a step of determining, by a priority determination unit, a transfer priority of current data including product data or order data of a current order over preceding data including product data or order data of a preceding order based on a determination condition of transfer priorities, a step of performing, by a transfer controller, control such that the preceding data and the current data are transferred according to the transfer priorities, and a step of changing, by a transfer sequence change unit, the transfer priorities such that the transfer of the preceding data is interrupted and the transfer of the current data is started in a case where a transfer priority of the preceding data is lower than the transfer priority of the current data and a usage status of a bandwidth of the network due to the transfer of the preceding data is equal to or greater than a predetermined threshold value.

The present invention provides a program causing a computer to execute the steps of the image processing method.

The present invention provides a computer-readable recording medium having recorded thereon a program causing a computer to execute the steps of the image processing method.

According to the present invention, the finish time of the print product is significantly shortened by controlling the transfer priority for both download and upload based on the usage status of the bandwidth of the network and dynamically changing the bandwidth of the network. According to the present invention, the transfer priorities can be controlled both between the store and the cloud and between the print laboratory and the cloud.

DESCRIPTION OF THE PREFERRED EMBODIMENTS

Hereinafter, an image processing apparatus, an image processing method, a program, and a recording medium according to an embodiment of the present invention will be described in detail based on preferred embodiments shown in the accompanying drawings.

Figure 1:
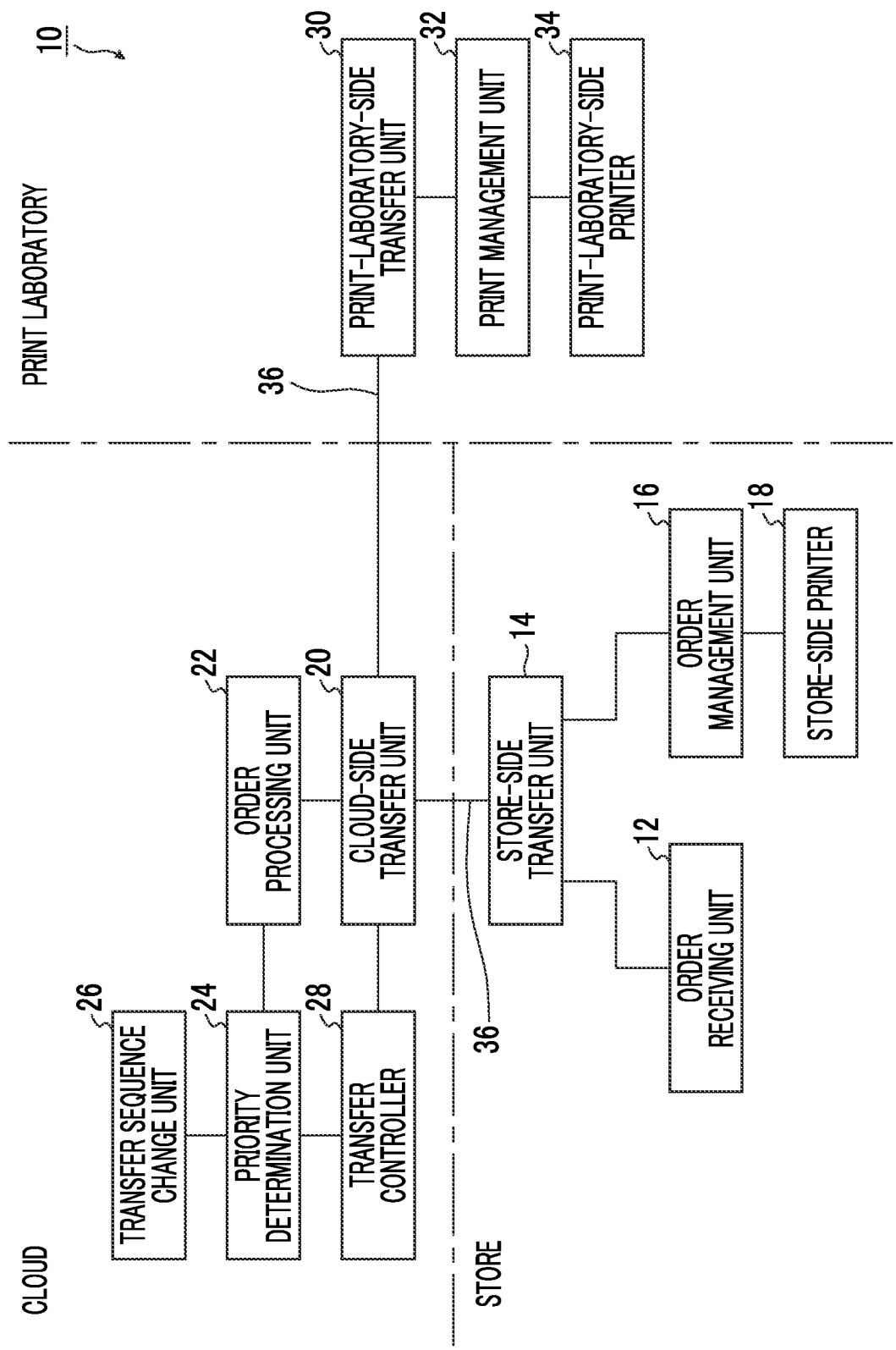
FIG. 1 is a block diagram of an embodiment showing a configuration of an image processing apparatus according to an embodiment of the present invention.

FIG. 1 is a block diagram of an embodiment showing a configuration of an image processing apparatus according to the embodiment of the present invention. An image processing apparatus 10 shown in FIG. 1 is an apparatus using a cloud-type kiosk terminal, and transmits (uploads) order data corresponding to an order of a user from a store such as a photo shop to a server on a cloud via a network, creates product data of a print product corresponding to the order data on the server, receives (downloads) the product data from the server to the store or a print laboratory (print production factory) via the network, and prints the print product corresponding to the product data in the store or the print laboratory.

The image processing apparatus 10 includes an order receiving unit 12, a store-side transfer unit 14, an order management unit 16, and a store-side printer 18 in the store.

The image processing apparatus 10 includes a cloud-side transfer unit 20, an order processing unit 22, a priority determination unit 24, a transfer sequence change unit 26, and a transfer controller 28 on the cloud.

The image processing apparatus 10 includes a print-laboratory-side transfer unit 30, a print management unit 32, and a print-laboratory-side printer 34 in the print laboratory.

The order receiving unit 12 and the order management unit 16 of the store and the print management unit 32 of the print laboratory are examples of a first processor according to the embodiment of the present invention. The order processing unit 22, the priority determination unit 24, the transfer sequence change unit 26, and the transfer controller 28 on the cloud are examples of a second processor according to the embodiment of the present invention.

In FIG. 1, only one store (order receiving unit 12, store-side transfer unit 14, order management unit 16, and store-side printer 18), one server on the cloud (cloud-side transfer unit 20, order processing unit 22, priority determination unit 24, transfer sequence change unit 26, and transfer controller 28), and one print laboratory (print-laboratory-side transfer unit 30, print management unit 32 and print-laboratory-side printer 34) are shown. However, the present invention is not limited thereto, and the image processing apparatus 10 may include a plurality of stores, may include a plurality of servers, or may include a plurality of print laboratories.

For example, one server can be provided in each of eastern Japan and western Japan, and the server in eastern Japan can be set to handle all stores in eastern Japan, and the server in western Japan can be set to handle all stores in western Japan. In a case where one of the servers in eastern Japan and western Japan cannot be used due to a disaster, power outage, inspection, or the like, it is also possible to set the other server to handle all stores nationwide.

The print laboratory may include a large laboratory and a mini laboratory. A difference between the large laboratory and the mini laboratory is a production capacity and a delivery route of the print product.

The large laboratory has a higher production capacity than the mini laboratory, and for example, the print product produced in the large laboratory is delivered directly to the store or the user, or is delivered to the store or the user via a delivery base.

On the other hand, the print product produced in the mini laboratory is delivered directly to, for example, a nearby store or user. The mini laboratory is equivalent to a store that does not include the order receiving unit 12, and products that can be produced in the store and the mini laboratory are generally the same.

In the store, the order receiving unit 12 is connected to the store-side transfer unit 14. The order management unit 16 and the store-side printer 18 are sequentially connected to the store-side transfer unit 14. The store-side transfer unit 14 is connected to the cloud-side transfer unit 20 via a network (global network) 36 such as the Internet and a telephone line.

On the cloud, the cloud-side transfer unit 20 is connected to the order processing unit 22, and the order processing unit 22 is connected to the priority determination unit 24. The priority determination unit 24 is connected to the transfer sequence change unit 26 and the transfer controller 28, and the transfer controller 28 is connected to the cloud-side transfer unit 20.

In the print laboratory, the print management unit 32 and the print-laboratory-side printer 34 are sequentially connected to the print-laboratory-side transfer unit 30. The print-laboratory-side transfer unit 30 is connected to the cloud-side transfer unit 20 via the network 36.

In the store, the order receiving unit 12 is a cloud-type kiosk terminal, and receives, as an input, order data including print product materials corresponding to the order of the user and the pieces of image data of images to be applied to the print product materials from the user. The order receiving unit 12 transmits the order data or the like to the order processing unit 22 on the cloud via the store-side transfer unit 14, the network 36, and the cloud-side transfer unit 20 on the cloud under the control of the transfer controller 28 on the cloud.

The print product material represents a type of a product material for creating various print products such as a photographic print, a calendar containing photos, and a photo book (photo album).

The store-side transfer unit 14 transfers (transmits and receives) various kinds of data between the store and the cloud via the network 36 under the control of the order receiving unit 12 and the order management unit 16.

The store-side transfer unit 14 transmits the order data or the like to the cloud-side transfer unit 20 on the cloud under the control of the order receiving unit 12, and receives the product data or the like from the cloud-side transfer unit 20 under the control of the order management unit 16.

The store-side transfer unit 14 collects an operation log of a usage status of a bandwidth of the network 36 by the store from the store-side transfer unit 14 itself or from the order receiving unit 12 and the order management unit 16. The store-side transfer unit 14 collects an operation log of a usage status of the store-side printer 18 of the store. These operation logs are periodically transmitted to the cloud by the store-side transfer unit 14.

The order management unit 16 manages the order of the user and the print of the print product, and receives the product data or the like from the order processing unit 22 via the cloud-side transfer unit 20, the network 36, and the store-side transfer unit 14 under the control of the transfer controller 28. The order management unit 16 causes the store-side printer 18 to print the print product corresponding to the product data received via the store-side transfer unit 14.

The store-side printer 18 prints a print product of which a print location is the store under the control of the order management unit 16.

A connection form of the store-side printer 18 is not particularly limited, and a network printer connected via a local network in the store, a local printer connected via a connection cable such as a universal serial bus (USB) cable, or the like may be used. A printing method of the store-side printer 18 is not particularly limited, and a gelatin silver printer, an inkjet printer, a laser printer, or the like may be used.

Subsequently, on the cloud, the cloud-side transfer unit 20 transmits and receives various kinds of data between the store and the cloud and between the print laboratory and the cloud via the network 36 under the control of the order processing unit 22.

The cloud-side transfer unit 20 receives the order data or the like from the store-side transfer unit 14, and transmits the product data or the like to the store-side transfer unit 14 or the print-laboratory-side transfer unit 30.

The order processing unit 22 receives the order data or the like from the order receiving unit 12 via the store-side transfer unit 14, the network 36, and the cloud-side transfer unit 20. The order processing unit 22 similarly creates the print product corresponding to the order data, that is, the product data (image data) of the print product of which the image data included in the order data is applied to the print product materials included in the order data based on the order data received via the cloud-side transfer unit 20. The order processing unit 22 transmits the product data or the like to the order management unit 16 of the store via the cloud-side transfer unit 20, the network 36, and the store-side transfer unit 14, or to the print management unit 32 of the print laboratory via the cloud-side transfer unit 20, the network 36, and the print-laboratory-side transfer unit 30.

The priority determination unit 24 determines a transfer priority of current data including order data or product data of a current order for preceding data including order data or product data of a preceding order based on a determination condition of transfer priorities. For example, in a case where the image processing apparatus 10 includes the plurality of stores, the priority determination unit 24 determines the transfer priority of the current data of one store that receives the current order for the preceding data of the plurality of stores, in other words, the preceding data of all the stores included in the image processing apparatus 10.

The preceding order is one or more orders that have already been ordered prior to the current order, and the current order is an order that has been ordered at this time.

The determination condition of the transfer priorities is not particularly limited, but includes, for example, the type of the print product material, order information including the number of images and a capacity of the image data, the transfer status of the preceding data (during transfer or during waiting for transfer), the priority of the preceding data, the print location of the print product (store or print laboratory), a target finish time (delivery date) of the print product, whether or not to forward the print product to the delivery base and a delivery time at the time of delivery of the print product, whether or not to designate speedy-finishing in the print laboratory, the number of images transferred and the number of printed images of the print product, the number of orders for the print product in a specific period, the usage status of the bandwidth (transfer speed or bandwidth usage) of the network 36, and usage statuses (during waiting or during operation) of the store-side printer 18 of the store and the print-laboratory-side printer 34 of the print laboratory.

The details of a method for determining the transfer priority will be described later.

For example, as a condition for changing the transfer priority, the transfer sequence change unit 26 changes the transfer priorities such that the transfer of the preceding data being transferred is interrupted and the transfer of the current data is started in a case where the transfer priority of the preceding data is lower than the transfer priority of the current data and the usage status of the bandwidth of the network 36 due to the transfer of the preceding data is equal to or greater than a predetermined threshold value.

In other words, the transfer sequence change unit 26 changes the transfer priority of the preceding data and the transfer priority of the current data such that the transfer of the preceding data is temporarily interrupted and the transfer of the current data is started in preference to the transfer of the preceding data in a case where the transfer priority of the current data is higher than the transfer priority of the preceding data and the usage of the bandwidth of the network 36 due to the transfer of the preceding data is large. The interrupted transfer of the preceding data is resumed, for example, after the transfer of the current data is completed.

The transfer controller 28 controls the transfer of the pieces of image data by the order receiving unit 12 and the order management unit 16 of the store and the print management unit 32 of the print laboratory via the cloud-side transfer unit 20 such that the preceding data and the current data are transferred between the store and the cloud and between the print laboratory and the cloud according to the transfer priority determined by the priority determination unit 24.

The transfer controller 28 may perform control such that pieces of image data corresponding to two or more orders are simultaneously transferred in a case where there is room in the bandwidth of the network 36. The transfer controller 28 may perform control such that the pieces of image data are divided into two or more groups and are transferred in at least one of a case where the capacity of the pieces of image data is equal or greater than a threshold value or a case where a delay time of the network 36 is equal to or greater than a threshold value, may perform control such that an upper limit of the bandwidth of the network 36 used at the time of transferring the pieces of image data is determined and the pieces of image data are transferred, or may simultaneously perform both the controls.

The delay time of the network 36 is a time from when very small data such as a response request is transmitted to a reception destination from a transmission source to when a response result thereof is received from the reception destination to the transmission source on the assumption that the delay time is measured periodically in order to constantly monitor the usage status of the bandwidth of the network 36. The delay time is short in a case where the bandwidth of the network 36 is sufficiently free (in a case where the usage status of the bandwidth is close to zero), and is long in a case where the bandwidth of the network 36 is congested (tight) (in a case where the usage status of the bandwidth is large).

Subsequently, in the print laboratory, the print-laboratory-side transfer unit 30 transfers various kinds of data between the print laboratory and the cloud via the network 36 under the control of the print management unit 32.

The print-laboratory-side transfer unit 30 receives the product data or the like from the cloud-side transfer unit 20.

The print-laboratory-side transfer unit 30 collects the operation log of the usage status of the bandwidth of the network 36 by the print laboratory from the print-laboratory-side transfer unit 30 or the print management unit 32. This operation log is periodically transmitted to the cloud by the print-laboratory-side transfer unit 30.

The print management unit 32 manages the order of the user and the print of the print product, and receives the product data from the order processing unit 22 via the cloud-side transfer unit 20, the network 36, and the print-laboratory-side transfer unit 30 under the control of the transfer controller 28. The print management unit 32 causes the print-laboratory-side printer 34 to print the print product corresponding to the product data received via the print-laboratory-side transfer unit 30.

The print-laboratory-side printer 34 prints the print product of which the print location is the print laboratory under the control of the print management unit 32.

The print-laboratory-side printer 34 is not particularly limited, and may be a network printer or a local printer, or may be a gelatin silver printer, an inkjet printer, a laser printer, or the like.

Next, the method for determining the transfer priority will be described.

For example, it is determined whether the print product of which the print location is the store (store-produced print product) or the print product of which the print location is the print laboratory print product (laboratory-produced print product) depending on the type of the print product material. The target finish time of the laboratory-produced print product is usually one week or longer, and is longer than the target finish time of the store-produced print product.

Thus, it is desirable to preferentially transfer the image data of the store-produced print product having a relatively short target finish time.

Accordingly, the priority determination unit 24 determines the transfer priorities such that the transfer priority of the order data or the product data corresponding to the print product printed by the store-side printer 18 of the store is higher than the transfer priority of the order data or the product data corresponding to the print product printed by the print-laboratory-side printer 34 of the print laboratory.

Target finish times of the print products are different depending on the type of the print product material even for the print products produced in the same store or the same laboratory. For example, in the case of the store-produced print products, a target finish time of a postcard and a photographic print is within 10 minutes, a target finish time of a calendar including photos is within 30 minutes, and a target finish time of a photo book is 1 hour.

Thus, it is desirable to preferentially transfer the image data of the print product having a relatively short target finish time.

Accordingly, the priority determination unit 24 can determine the transfer priorities such that a transfer priority of order data or product data corresponding to a print product for a first target finish time is higher than a transfer priority of order data or product data corresponding to a print product for a second target finish time longer than the first target finish time.

Among the laboratory-produced print products, since the print products delivered from the print laboratory, for example, the large laboratory to the store or the user via the delivery base further need to have more delivery days than the print products delivered directly from the print laboratory, for example, the mini laboratory to the store or the user, the target finish time is longer.

Thus, it is desirable to preferentially transfer the image data of the print product that is directly delivered and has a short target finish time.

Accordingly, the priority determination unit 24 can determine the transfer priorities such that among the print products printed by the print-laboratory-side printer 34 of the print laboratory, the transfer priority of the product data corresponding to the print product directly delivered to the store or the user from the print laboratory is higher than the transfer priority of the product data corresponding to the print product that is forwarded from the print laboratory to the delivery base and is delivered from the delivery base to the store or user.

In a case where the laboratory-produced print product is ordered, there is a service that allows the user to pay an additional fee to finish the product in a shorter delivery date than a default target finish time. That is, the target finish time of the print product for which the speedy-finishing is designated is shorter than the default target finish time.

Thus, it is desirable to preferentially transfer the image data of the print product for which the speedy-finishing is designated and of which the target finish time is short.

Accordingly, the priority determination unit 24 can determine the transfer priorities such that among the print products printed by the print-laboratory-side printer 34 of the print laboratory, the transfer priority of the order data or the product data corresponding to the print product for which the speedy-finishing is designated is higher than the transfer priority of the order data or the product data corresponding to the print product for which the speedy-finishing is not designated.

The store-produced print products include print products printed by the gelatin silver printer and print products printed by the inkjet printer, the laser printer, or the like. For example, even though there are a large number of print products printed by the gelatin silver printer, there may be no or very few print products printed by the inkjet printer or the laser printer.

Thus, it is desirable to preferentially transfer the image data of the print product printed by the stopped store-side printer 18.

Accordingly, the priority determination unit 24 can determine the transfer priorities such that the transfer priority of the order data or the product data corresponding to the print product printed by the waiting store-side printer 18 is higher than the transfer priority of the order data or the product data corresponding to the print product printed by the operating store-side printer 18 based on the operation log of the usage status of the store-side printer 18 of the store.

For example, in a case where a postcard such as a New Year's card is ordered, even though the number of images transferred is one, the number of prints may be much larger than the number of images transferred like a case where the number of prints is ten. On the other hand, in a case where a photographic print of an image captured by a smartphone, a digital camera, or the like is ordered, for example, one photographic print may be ordered for each photo like a case where the number of images transferred is ten and the number of prints is also ten.

As described above, a relationship between the number of images transferred and the number of prints are different depending on the print product materials. Since a print time of the print product is overwhelmingly longer than a transfer time of the image data, it is desirable to preferentially transfer the image data of the print product for which the number of images transferred is smaller and the number of prints is larger.

Accordingly, the priority determination unit 24 can determine the transfer priorities such that a transfer priority of order data or product data corresponding to a first print product material for which the number of prints with respect to the number of images transferred is larger than a second print product material is higher than a transfer priority of order data or product data corresponding to the second print product material for which the number of prints with respect to the number of images transferred is smaller than the first print product materials.

For example, it is considered that ten postcards and ten photographic prints are ordered and are produced in the store. In this case, even though the same ten print products are produced, as described above, for example, in the case of the photographic prints, pieces of image data of 10 different images are transferred, and ten different photographic prints are printed, and in the case of the postcards, image data of one image is transferred and the same ten postcards are printed.

Figure 2:
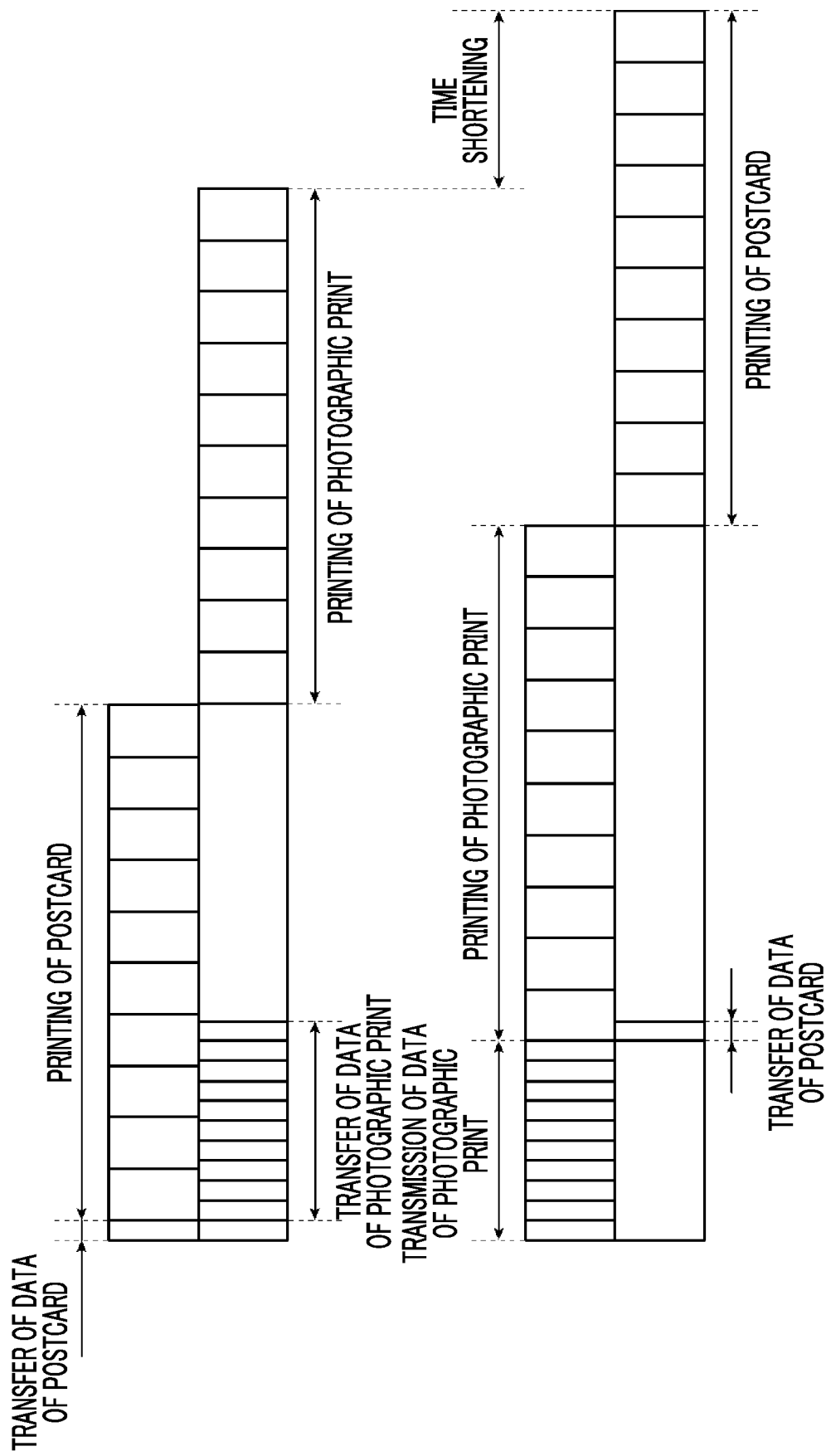
FIG. 2 is a conceptual diagram of an embodiment showing a difference in a finish time in a case where transfer of image data of a postcard is prioritized and transfer of image data of a photographic print is prioritized.

FIG. 2 is a conceptual diagram of an embodiment showing a difference in finish time in a case where the transfer of the image data of the postcard is prioritized and the transfer of the image data of the photographic print is prioritized. In FIG. 2, a time elapses from a left side to a right side. An upper conceptual diagram of FIG. 2 shows a time flow in a case where the transfer of the image data of the postcard is prioritized, and a lower conceptual diagram shows a time flow in a case where the transfer of the image data of the photographic print is prioritized.

Here, it is assumed that the postcard and the photographic print are printed by the same printer, and have the same printing speed.

As shown on a lower side of FIG. 2, in a case where the transfer of the image data of the photographic print is prioritized, the pieces of image data of ten images are first transferred, and then the ten photographic prints are printed. On the other hand, in a case where the image data of the postcard is transferred, the image data of one image is transferred after the transfer of the image data of the photographic print is completed, and then ten postcards are printed after the printing of the photographic print is completed.

On the other hand, in a case where the transfer of the image data of the postcard is prioritized, the image data of one image is first transferred, and then ten postcards are printed. On the other hand, in a case where the image data of the photographic print is transferred, the pieces of image data of ten images are transferred after the transfer of the image data of the postcard is completed, and then ten photographic prints are printed after the printing of the postcard is completed.

As described above, in a case where the transfer of the image data of the photographic print is prioritized, the image data of one image of the postcard is transferred during the printing of the ten photographic prints, whereas in a case where the transfer of the image data of the postcard is prioritized, the pieces of image data of the ten images of the photographic prints are transferred during the printing of the ten postcards. Thus, in a case where the transfer of the image data of the postcard is prioritized, the finish time can be shortened by a time required to transfer pieces of image data of nine images than in a case where the transfer of the image data of the photographic print is prioritized.

It is possible to predict trends such as the number of orders for the print product for each type of print product materials and the usage status of the bandwidth of the network 36 for a specific period, for example, at the end of August based on the number of orders for the print product and the operation log such as the usage status of the bandwidth of the network 36 for each type of the print product materials in a specific period in the past, for example, a specific season, a specific month, a specific week, a specific day of the week, a specific day, a specific time zone, or the like.

Among the print product materials, there are seasonal print product materials in which the number of orders varies depending on the season. For example, in November and December, there is a great demand for New Year's cards and calendars including photos. There is a tendency that there are many orders for photo books in the graduation and March of a graduation season and photographic prints of images captured by smartphones and digital cameras at the end of August at which a summer vacation is ended.

Thus, it is desirable to preferentially transfer the image data of the print product material for which the number of orders for the print product is large, that is, the demand is predicted to be large, in a specific period.

Accordingly, the priority determination unit 24 can determine the transfer priorities such that a transfer priority of order data or product data corresponding to a third print product material for which the number of orders for the print product in a specific period is larger than a fourth print product material is higher than a transfer priority of order data or product data corresponding to the fourth print product material for which the number of orders for the print product is smaller than the third print product material.

For example, it is known that a peak of the orders for the photographic prints of the images captured by smartphones and digital cameras at the end of August is concentrated in a time zone from 13:00 to 18:00 on Sunday.

Thus, in a case where the usage status of the bandwidth of the network 36 is congested at a specific time zone, that is, the bandwidth of the network 36 is predicted to be tight, it is desirable to determine the transfer priority such that the transfer priority of the image data of the print product material corresponding to the laboratory-produced print product having a long target finish time is the lowest and to transfer the image data after 18:00 at which the usage status of the bandwidth of the network 36 is not congested, that is, it is predicted that there is room in the bandwidth of the network 36.

Although the specific time zone may be a specific time zone on a specific day, it is desirable to compare the number of orders for the print product and the usage status of the bandwidth of the network 36 corresponding to each print product material in a specific time zone on a specific day of the week such as the last Sunday in August.

Accordingly, the priority determination unit 24 can determine the transfer priorities such that based on the operation log of the usage status of the bandwidth of the network 36 in the specific time zone of the past specific day of the week, in a case where the usage status of the bandwidth of the network 36 in the specific time zone of the past day of the week is equal to or greater than a threshold value, the transfer priority of the order data or the product data corresponding to the print product printed by the print-laboratory-side printer 34 of the print laboratory in a specific time zone on a current specific day of the week is the lowest.

A method for determining the transfer priorities in a case where two or more order receiving units 12 are connected to the order processing unit 22 (for example, in a case where there are two or more stores) will be described.

In a case where the bandwidth of the network 36 is not tight, that is, in a case where the usage of the bandwidth of the network 36 is equal to or less than a certain level in all the order receiving units 12, a method similar to the determination method in a case where one order receiving unit 12 receives orders at different timings may be used.

Unlike this, in a case where the usage of the bandwidth of the network 36 is equal to or greater than a threshold value in one or more order receiving units 12 among all the order receiving units 12, the transfer priorities can be determined in consideration of the usage of the bandwidth of the network 36 which is equal to or greater than the threshold value. That is, in the above-mentioned example of the determination of the transfer priorities of the postcard and the photographic print, the transfer priorities can be determined even though there are two or more order receiving units 12 by estimating a time required for the transfer of the data is estimated according to the transfer speed of each order receiving unit 12 and comparing processing sequences of the transmission of the pieces of order data (pieces of image data) from all the order receiving units 12 and the creation of the print products.

A method for determining the transfer priorities in a case where two or more order processing units 22 are connected to one or two or more order receiving units 12 will be described.

In a case where each order processing unit 22 has exclusive jurisdiction such as only orders in eastern Japan or only orders in western Japan, a method similar to the determination method of the transfer priorities in a case where one order processing unit 22 is connected to one or two or more order receiving units 12 is used.

On the other hand, it is considered that two or more order receiving units 12 may transfer the data to any of two or more order processing units 22. In this case, as a first method, one order processing unit 22 (hereinafter, referred to as a central order processing unit) calculates the transfer priority of the other order processing unit 22. For an order newly received by a certain order receiving unit 12, the central order processing unit calculates a case where all the order processing units 22 transmit the order data and create the print product, and determines the order processing unit 22 that finishes the creation of the print product earliest. The central order processing unit can cause the order processing unit 22 that finishes the creation of the print product earliest to perform the transmission of the order data and the creation of the print product for the newly received order. As a second method, in a case where a certain order receiving unit 12 newly receives an order, a creation completion time of the print product in a case where each order processing unit 22 performs the transmission of the order data and the creation of the print product is calculated, and is replied to the order receiving unit 12. It is possible to perform the transmission of the order data regarding the newly received order and the creation of the print product to the order processing unit 22 having the earliest completion time. In both the first method and the second method, the usage of the bandwidth of the network 36 between a certain order receiving unit 12 and each order processing unit 22, a processing speed of each order processing unit 22, and the like are also considered.

Next, an operation of the image processing apparatus 10 will be described.

Figure 3:
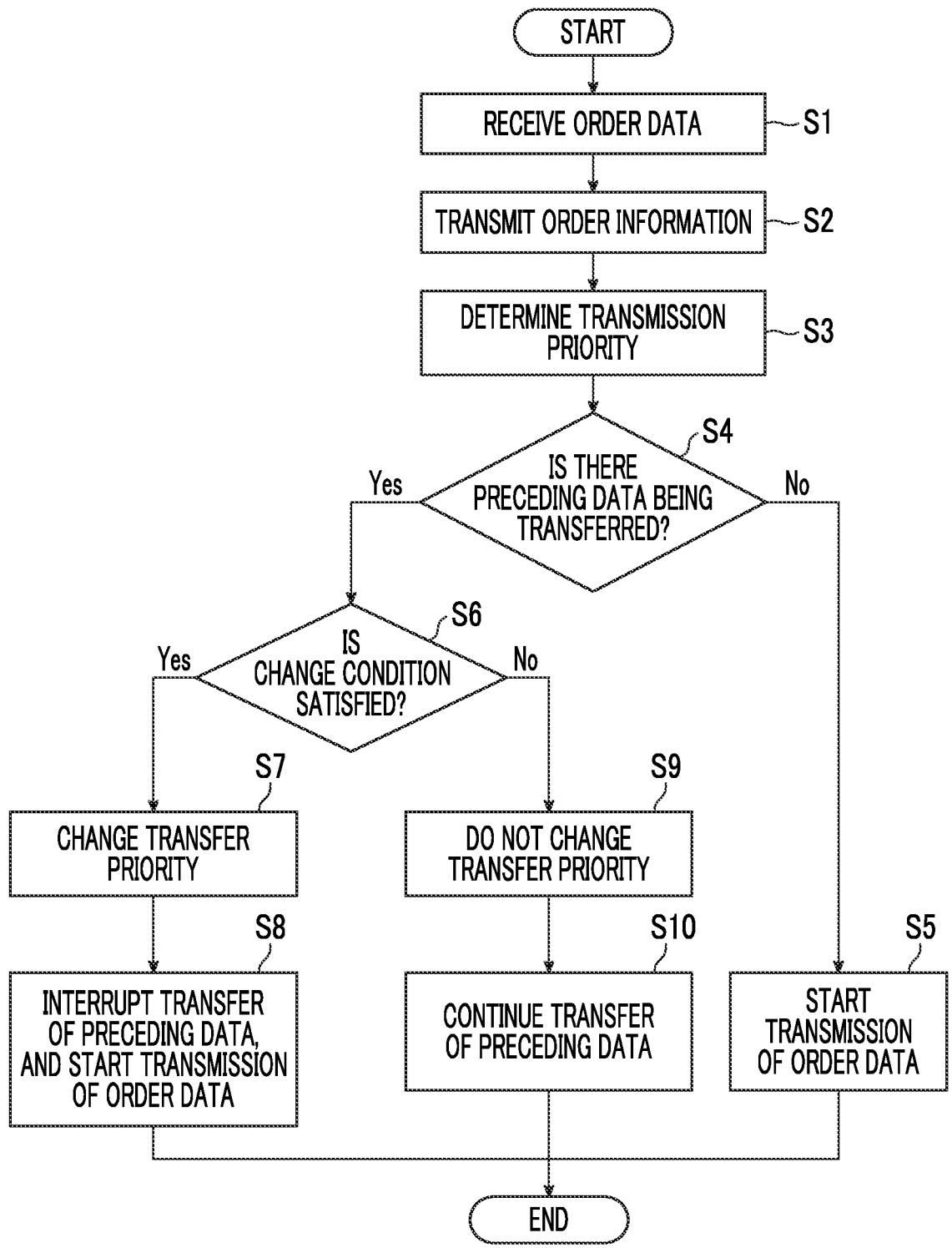
FIG. 3 is a flowchart of an embodiment showing an operation in a case where order data is transmitted in the image processing apparatus shown in FIG. 1.

First, a case where the order data of the current order is transmitted from the store to the cloud will be described with reference to the flowchart shown in FIG. 3.

In this case, first, in the store, in a case where the user operates the order receiving unit 12 to input the order data, the order receiving unit 12 receives, as the input, the order data (order data of the current order) from the user (step S1).

After the order data of the current order is received as the input, the order receiving unit 12 transmits, in advance, the order information including the types of the print product materials, the number of images, and the capacity of the image data included in the order data of the current order to the priority determination unit 24 on the cloud (step S2). Immediately before a timing of moment, the transmission of the image data included in the order data of the current order from the store to the cloud is not started.

That is, the store-side transfer unit 14 transmits the order information of the current order to the cloud-side transfer unit 20 on the cloud via the network 36 under the control of the order receiving unit 12.

Accordingly, the cloud-side transfer unit 20 receives the order information of the current order from the store-side transfer unit 14 via the network 36.

The order information of the current order is transmitted to a management server (not shown) and is managed by the management server.

Subsequently, on the cloud, the priority determination unit 24 determines the transmission priority of the order data (current data) of the current order over the preceding data of the preceding order based on the determination condition of the transfer priorities including the order information of the current order (step S3).

As a result, in a case where there is no preceding data being transferred (No in step S4), the transmission priority of the order data of the current order is the highest.

Accordingly, the transfer controller 28 controls the transfer of the image data by the order receiving unit 12, and the order receiving unit 12 starts the transmission of the order data of the current order (step S5).

On the other hand, in a case where there is the preceding data being transferred (Yes in step S4), the transfer sequence change unit 26 performs the control of changing the transfer priority.

In a case where the condition for changing the transfer priority is satisfied, that is, in a case where the transfer priority of the preceding data is lower than the transmission priority of the order data of the current order and the usage status of the bandwidth of the network 36 due to the transfer of the preceding data is equal to or greater than a predetermined threshold value (Yes in step S6), the transfer sequence change unit 26 changes the transfer priorities such that the transfer of the preceding data is interrupted and the transmission of the order data of the current order is started (step S7).

Accordingly, the transfer controller 28 controls the transfer of the image data by the order receiving unit 12, the order management unit 16, and the print management unit 32 according to the transfer priority.

As a result, the transfer of the preceding data is interrupted, and the order receiving unit 12 starts the transmission of the order data of the current order (step S8).

On the other hand, in a case where the condition for changing the transfer priority is not satisfied, that is, in a case where the transfer priority of the preceding data is higher than the transmission priority of the order data of the current order or in a case where the usage status of the bandwidth of the network 36 due to the transfer of the preceding data is less than the predetermined threshold value (No in step S6), the transfer sequence change unit 26 does not change the transfer priorities (step S9).

In a case where the priority determination unit 24 determines that the transfer priority of the order data of the current order and the transmission priority of the preceding data are the same, the transfer sequence change unit 26 determines the transfer priorities so as to be the same as the sequences in which the orders are performed. That is, in a case where the transfer priorities of the order data of the current order and the preceding data are the same, the transfer sequence change unit 26 determines the transfer priorities such that the transfer priority of the preceding data is higher than the transmission priority of the order data of the current order according to the sequences in which the orders are performed.

Accordingly, the transfer controller 28 controls the transfer of the image data by the order receiving unit 12, the order management unit 16, and the print management unit 32 according to the transfer priority.

As a result, the transfer of the preceding data is continued, and the order receiving unit 12 starts the transmission of the order data of the current order after the transfer of the preceding data is completed (step S10).

Subsequently, the order processing unit 22 creates the product data of the print product (product data of the current order) corresponding to the order data of the current order based on the order data of the current order received via the cloud-side transfer unit 20.

The control of changing the priority is not particularly limited, but is performed, for example, in a case where the bandwidth of the network 36 on the cloud side is congested (tight). In this case, the transfer between one store A and the server on the cloud and the transfer between the other store B and the server on the cloud are affected by each other. Thus, in a case where both the transfers cannot be simultaneously performed, the transfer with the higher priority is performed earlier.

On the other hand, in a case where the bandwidth of the network 36 on the cloud side is sufficiently free and is not congested (tight), the control of changing the priorities is not essential. In this case, even though there is the preceding data being transferred between one store A and the server on the cloud, the transfer between the other store B and the server on the cloud is not affected. Thus, both the transfer can be simultaneously performed.

Figure 4:
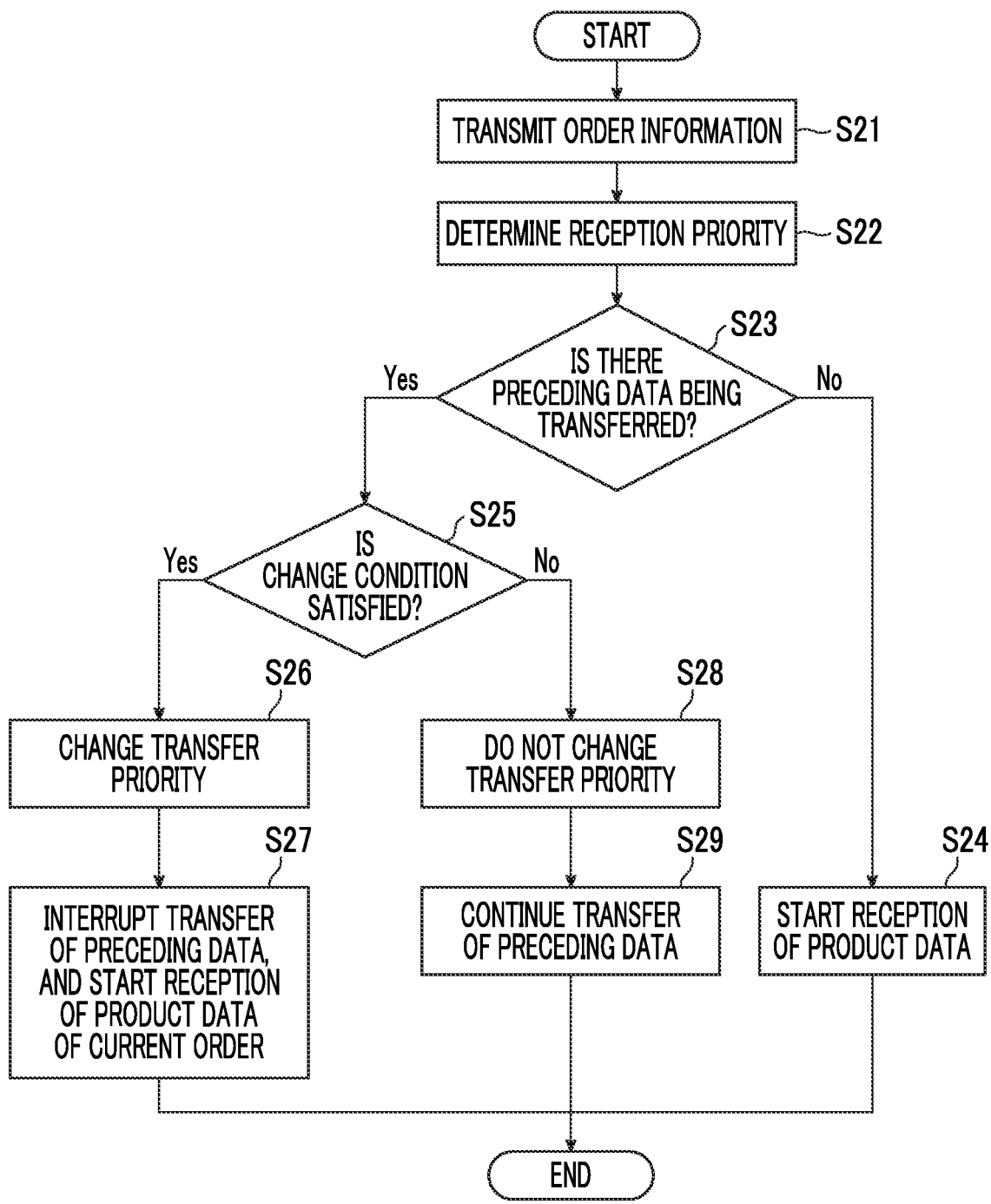
FIG. 4 is a flowchart of an embodiment showing an operation in a case where product data is received in the image processing apparatus shown in FIG. 1.

Next, a case where the product data of the current order is received from the cloud to the store or the print laboratory will be described with reference to the flowchart shown in FIG. 4.

In this case, first, the management server (not shown) transmits, in advance, the order information including the print location of the print product corresponding to the order data of the current order, the number of images, and the capacity of the image data to the priority determination unit 24 (step S21). Immediately before a timing of moment, the reception of the product data of the current order from the cloud from the store or the print laboratory is not started.

Subsequently, on the cloud, the priority determination unit 24 determines a reception priority of the product data of the current order over the preceding data of the preceding order based on the determination condition of the transfer priorities (step S22).

As a result, in a case where there is no preceding data being transferred (No in step S23), the reception priority of the product data of the current order is the highest.

Accordingly, the transfer controller 28 controls the transfer of the image data by the order management unit 16 of the store, and the order management unit 16 starts the reception of the product data of the current order (step S24).

On the other hand, in a case where there is the preceding data being transferred (Yes in step S23), the transfer sequence change unit 26 performs the control of changing the transfer priority.

In a case where the condition of changing the transfer priority is satisfied, that is, in a case where the transfer priority of the preceding data is lower than the reception priority of the product data of the current order and the usage status of the bandwidth of the network 36 due to the transfer of the preceding data is equal to or greater than a predetermined threshold value (Yes in step S25), the transfer sequence change unit 26 changes the transfer priorities such that the transfer of the preceding data is interrupted and the reception of the product data of the current order is started (step S26).

Accordingly, the transfer controller 28 controls the transfer of the image data by the order receiving unit 12, the order management unit 16, and the print management unit 32 according to the transfer priority.

As a result, the transfer of the preceding data is interrupted, and the order management unit 16 or the print management unit 32 starts the reception of the product data of the current order (step S27).

On the other hand, in a case where the condition of changing the transfer priority is not satisfied, that is, in a case where the transfer priority of the preceding data is higher than the reception priority of the product data of the current order or in a case where the usage status of the bandwidth of the network 36 due to the transfer of the preceding data is less than the predetermined threshold value (No in step S25), the transfer sequence change unit 26 does not change the transfer priorities (step S28).

Similarly, in a case where it is determined that the reception priority of the product data of the current order and the transfer priority of the preceding data are the same priority, the transfer sequence change unit 26 determines the transfer priorities so as to be the same as the sequences in which the orders are performed.

Accordingly, the transfer controller 28 controls the transfer of the image data by the order receiving unit 12, the order management unit 16, and the print management unit 32 according to the transfer priority.

As a result, the transfer of the preceding data is continued, and the order receiving unit 12 or the print management unit 32 starts the reception of the product data of the current order, for example, after the transfer of the preceding data is completed (step S29).

Here, in a case where the print location is the store, the cloud-side transfer unit 20 transmits the product data of the current order to the store-side transfer unit 14 via the network 36.

Accordingly, the store-side transfer unit 14 receives the product data of the current order from the cloud-side transfer unit 20 via the network 36.

Subsequently, the order management unit 16 causes the store-side printer 18 to print the print product corresponding to the product data of the current order received via the store-side transfer unit 14.

On the other hand, in a case where the print location is the print laboratory, the cloud-side transfer unit 20 transmits the product data of the current order to the print-laboratory-side transfer unit 30 via the network 36.

Accordingly, in the print laboratory, the print-laboratory-side transfer unit 30 receives the product data of the current order from the print-laboratory-side transfer unit 30 via the network 36.

Subsequently, the print management unit 32 causes the print-laboratory-side printer 34 to print the print product corresponding to the product data of the current order received via the print-laboratory-side transfer unit 30.

Next, a specific configuration of the image processing apparatus according to the embodiment of the present invention will be described.

Figure 5:
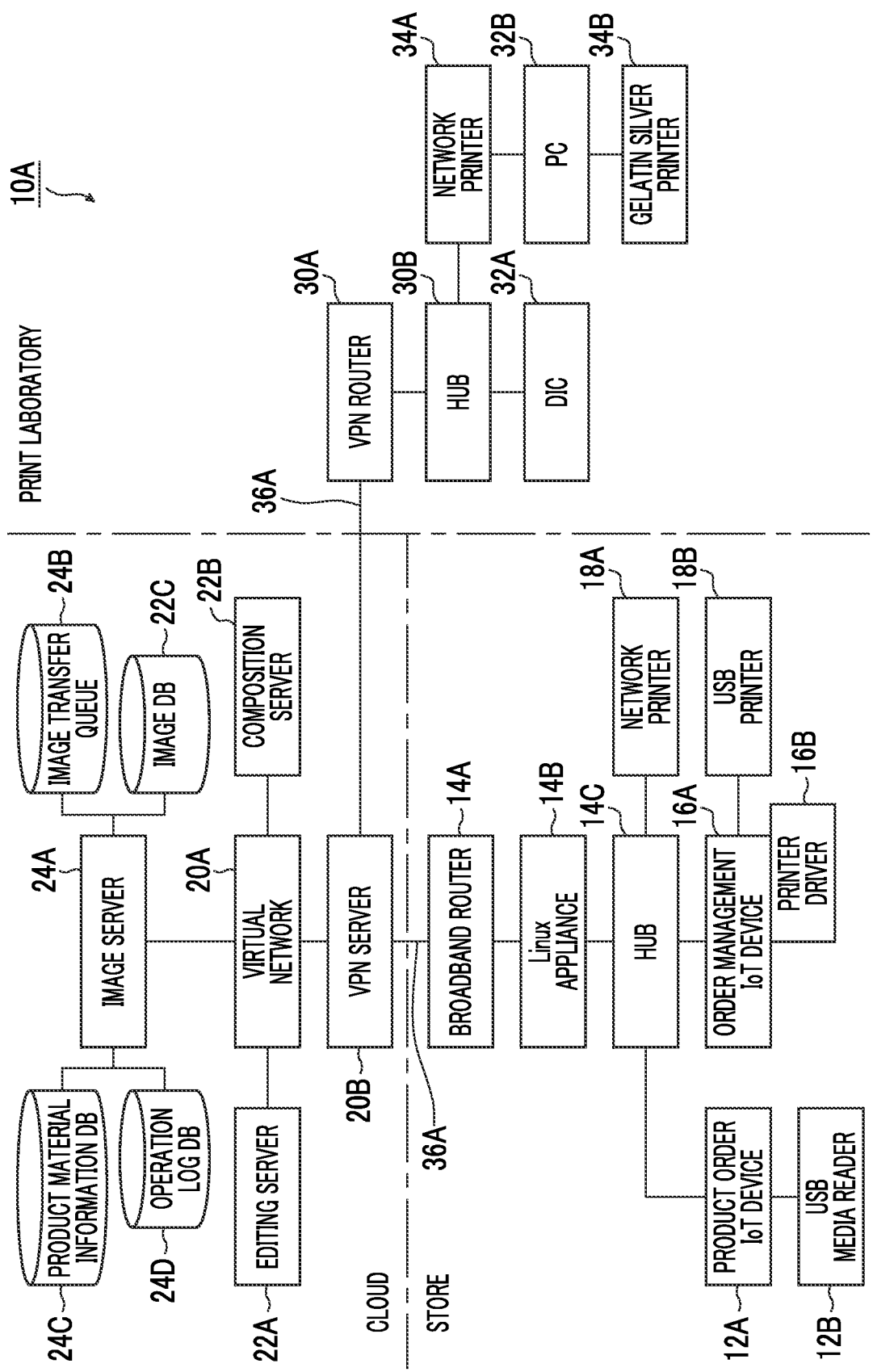
FIG. 5 is a block diagram of an embodiment showing a specific configuration of the image processing apparatus according to the embodiment of the present invention.

FIG. 5 is a block diagram of an embodiment showing a specific configuration of the image processing apparatus according to the embodiment of the present invention.

An image processing apparatus 10A shown in FIG. 5 includes a product order Internet of things (IoT) device 12A, a USB media reader 12B, a broadband router 14A, a Linux (registered trademark) appliance 14B, a hub 14C, an order management IoT device 16A, a printer driver 16B, a network printer 18A, and a USB printer 18B in the store.

The image processing apparatus 10A includes a virtual network 20A, a virtual private network (VPN) server 20B, an editing server 22A, a composition server 22B, an image database (DB) 22C, an image server 24A, an image transfer queue 24B, a product material information DB 24C, and an operation log DB 24D on the cloud.

The image processing apparatus 10A includes a VPN router 30A, a hub 30B, a digital image controller (DIC) 32A, a printer controller (PC) 32B, a network printer 34A, and a gelatin silver printer 34B in the print laboratory.

In the store, the broadband router 14A, the Linux appliance 14B, and the hub 14C are sequentially connected. The hub 14C is connected to the product order IoT device 12A, the order management IoT device 16A, and the network printer 18A. The product order IoT device 12A is connected to the USB media reader 12B, and the order management IoT device 16A is connected to the USB printer 18B. The broadband router 14A is connected to the VPN server 20B via the network 36A.

On the cloud, the image server 24A, the virtual network 20A, and the VPN server 20B are sequentially connected. The image server 24A is connected to the image transfer queue 24B, the product material information DB 24C, the operation log DB 24D, and the image DB 22C. The editing server 22A and the composition server 22B are connected to the virtual network 20A.

In the print laboratory, the VPN router 30A, the hub 30B, and the DIC 32A are sequentially connected. The hub 30B is connected to the network printer 34A. The hub 30B and the DIC 32A are connected to the PC 32B, and the PC 32B is connected to the gelatin silver printer 34B. The VPN router 30A is connected to the VPN server 20B via the network 36A.

In the store, the product order IoT device 12A is an example of the order receiving unit 12, and is, for example, a personal computer or the like. One or two or more product order IoT devices 12A are installed in the store.

The USB media reader 12B reads image data corresponding to the image of the user from a recording medium such as a secure digital (SD) memory card of the user.

The product order IoT device 12A receives, as the input, the order data including the print product materials and the pieces of image data read by the USB media reader 12B from the user. The product order IoT device 12A also has a function of transferring and receiving the image data from a smartphone, a digital camera, or the like to the product order IoT device 12A by a wired connection such as a USB cable or a wireless connection such as Wi-Fi (registered trademark).

The broadband router 14A, the Linux appliance 14B, and the hub 14C are examples of the store-side transfer unit 14, and transfers (transmits and receives) various kinds of data via the network 36A between the store and the cloud under the control of the product order IoT device 12A and the order management IoT device 16A.

The Linux appliance 14B is in a state of being VPN-connected to the VPN server 20B on the cloud via the broadband router 14A and the network 36A. The order data or the like is transmitted from the product order IoT device 12A to the image server 24A or the like via the hub 14C, the Linux appliance 14B, the broadband router 14A, the network 36A, the VPN server 20B, and the virtual network 20A. The product data or the like is received from the composition server 22B to the order management IoT device 16A via the virtual network 20A, the VPN server 20B, the network 36A, the broadband router 14A, the Linux appliance 14B, and the hub 14C.

The Linux appliance 14B collects the operation log of the usage status of the bandwidth of the network 36A by the store from the broadband router 14A and the hub 14C, or the product order IoT device 12A and the order management IoT device 16A. This operation log is periodically transmitted to the cloud by the Linux appliance 14B, and is stored in the operation log DB 24D under the control of the image server 24A.

A VPN router may be provided instead of the broadband router 14A and the Linux appliance 14B. In this case, the VPN router is in a state of being VPN-connected to the VPN server 20B. The order data or the like is transmitted to the image server 24A or the like via the hub 14C, the VPN router, the network 36A, the VPN server 20B, and the virtual network 20A. The product data or the like is received from the composition server 22B to the order management IoT device 16A via the virtual network 20A, the VPN server 20B, the network 36A, the VPN router, and the hub 14C.

The order management IoT device 16A is an example of the order management unit 16, and is, for example, a personal computer or the like. One order management IoT device 16A is usually installed in the store.

The printer driver 16B is installed in the order management IoT device 16A. The printer driver 16B controls printing by the network printer 18A and the USB printer 18B. Under the control of the printer driver 16B, the order management IoT device 16A causes the network printer 18A and the USB printer 18B to print the print product corresponding to the product data received from the composition server 22B.

The network printer 18A and the USB printer 18B are examples of the store-side printer 18.

Subsequently, on the cloud, the virtual network 20A and the VPN server 20B are examples of the cloud-side transfer unit 20, and performs the transmission and reception of various kinds of data between the store and the cloud and between the print laboratory and the cloud under the control of the image server 24A, the editing server 22A, and the composition server 22B via the network 36A.

The VPN server 20B is in a state of being VPN-connected to the VPN router 30A of the print laboratory in addition to the Linux appliance 14B of the store. As described above, the order data or the like is received from the product order IoT device 12A of the store to the image server 24A or the like, and the product data or the like is transmitted from the composition server 22B to the order management IoT device 16A or from the composition server 22B to the DIC 32A via the virtual network 20A, the VPN server 20B, the network 36A, and the VPN router 30A, and the hub 30B of the print laboratory.

The virtual network 20A is a network that virtually connects the VPN server 20B, the image server 24A, the editing server 22A, and the composition server 22B.

The editing server 22A, the composition server 22B, and the image DB 22C are examples of the order processing unit 22, and create the product data of the print product corresponding to the order data based on the order data received from the product order IoT device 12A under the control of the image server 24A.

In a case where, for example, the photo book is created, the editing server 22A provides a user interface (UI) screen for allowing the user to perform an editing work for inputting a title of the photo book, disposing a stamp, disposing an image, and changing a size, a layout, or the like on a screen of a web browser operating on the product order IoT device 12A.

The composition server 22B generates a composite image to become a final print product based on the editing work by the user, and creates, for example, image data of a photo book.

Under the control of the image server 24A, the image DB 22C stores image data of various images including the image data included in the order data and image data of the composite image to become the final print product.

The image server 24A, the image transfer queue 24B, the product material information DB 24C, and the operation log DB 24D are examples of the priority determination unit 24, the transfer sequence change unit 26, and the transfer controller 28.

The image transfer queue 24B stores the transfer status, the transfer priority, and the like of the preceding data under the control of the image server 24A.

The product material information DB 24C stores various kinds of information related to the print product materials, including the types of the print product materials and the target finish time of the print product set for each type of the print product material.

Under the control of the image server 24A, the operation log DB 24D stores the operation logs of the usage statuses of the bandwidths of the network 36A in the store and the print laboratory, the operation logs of the usage statuses of the printer of the store and the print laboratory, and the like.

The image server 24A (priority determination unit 24) determines the transfer priority of the current data of the current order over the preceding data of the preceding order based on the order information including the types of the print product materials, the number of images, and the capacity of the image data included in the current data, the target finish time of the print product acquired from the product material information DB 24C, the operation logs of the usage statuses of the bandwidths of the network in the store and the print laboratory acquired from the operation log DB 24D, and the transfer status and the transfer priority of the preceding data acquired from the image transfer queue 24B.

The image server 24A (transfer sequence change unit 26) changes the transfer priorities such that the transfer of the preceding data is interrupted and the transfer of the current data is started in a case where the transfer priority of the preceding data acquired from the image transfer queue 24B is lower than the transfer priority of the current data and the usage status of the bandwidth of the network 36A due to the transfer of the preceding data is equal to or greater than the predetermined threshold value based on the operation logs of the usage statuses of the bandwidths of the network 36A in the store and the print laboratory acquired from the operation log DB 24D.

The image server 24A (transfer controller 28) controls the transfer of the image data by the product order IoT device 12A and the order management IoT device 16A of the store and the DIC 32A of the print laboratory such that the preceding data and the current data are transferred between the store and the cloud and between the print laboratory and the cloud according to the transfer priority.

Subsequently, in the print laboratory, the VPN router 30A and the hub 30B are examples of the print-laboratory-side transfer unit 30, and transfer various kinds of data between the print laboratory and the cloud via the network 36A under the control of the DIC 32A.

As described above, the VPN router 30A is in a state of being VPN-connected to the VPN server 20B, and the product data or the like is received from the composition server 22B to the DIC 32A.

The VPN router 30A collects the operation log of the usage status of the bandwidth of the network 36A by the print laboratory from the VPN router 30A and the hub 30B, or the DIC 32A. This operation log is periodically transmitted to the cloud by the VPN router 30A, and is stored in the operation log DB 24D under the control of the image server 24A.

The DIC 32A and the PC 32B are examples of the print management unit 32.

The DIC 32A is an intermediary software for controlling printing, receives the product data from the VPN router 30A via the hub 30B, and controls operations of the network printer 34A and the gelatin silver printer 34B to print the print product corresponding to the product data.

Under the control of the DIC 32A, the PC 32B causes the gelatin silver printer 34B to print the print product corresponding to the product data.

The network printer 34A and the gelatin silver printer 34B are examples of the print-laboratory-side printer 34.

Next, an operation of the image processing apparatus 10A will be described.

Figure 6:
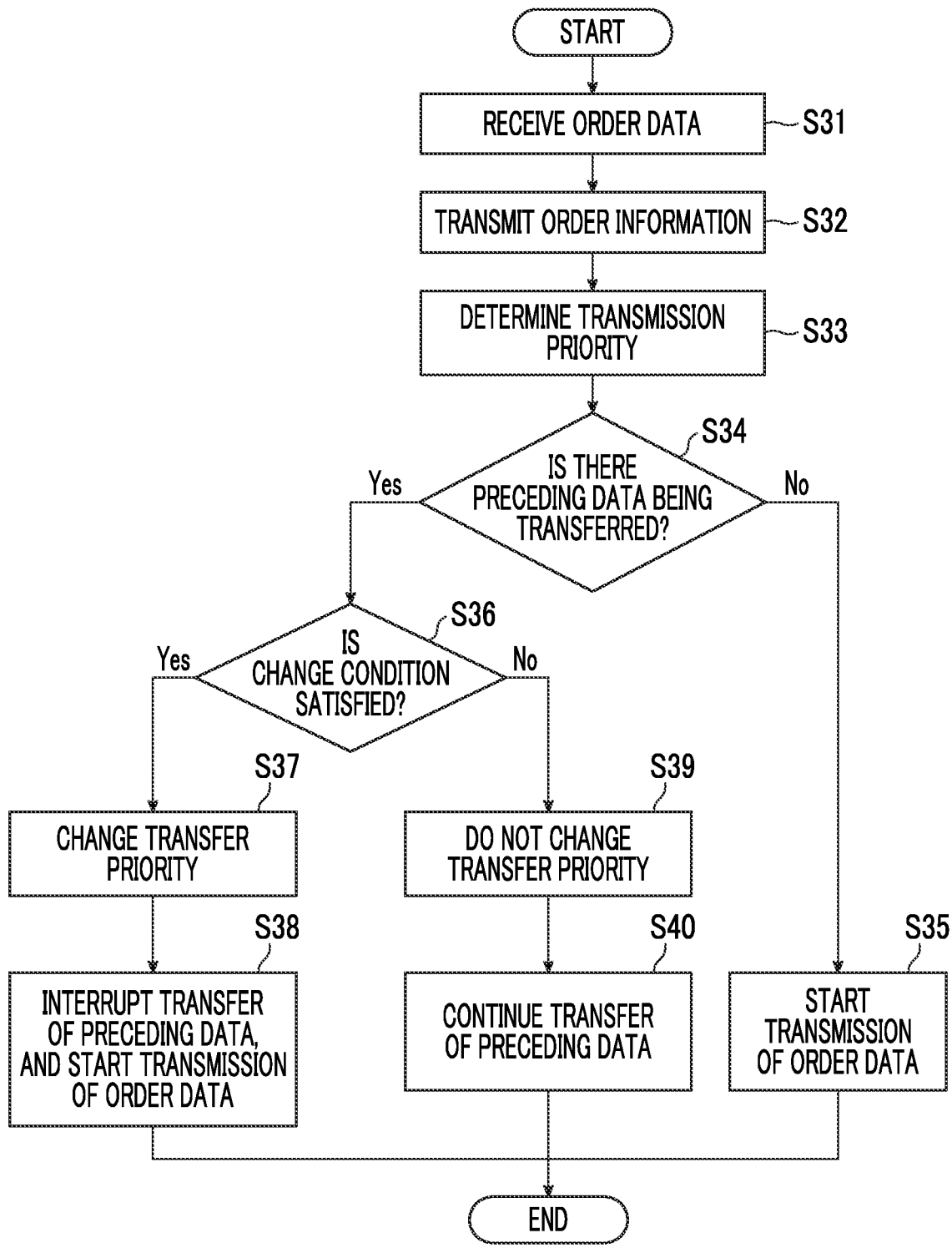
FIG. 6 is a flowchart of an embodiment showing an operation in a case where the order data is transmitted in the image processing apparatus shown in FIG. 5.

First, a case where the order data of the current order is transmitted from the store to the cloud will be described with reference to the flowchart shown in FIG. 6.

In this case, first, in the store, in a case where the user operates the product order IoT device 12A and the USB media reader 12B to input the order data, the product order IoT device 12A receives, as the input, the order data (order data of the current order) from the user (step S31).

After the order data of the current order is received as the input, the product order IoT device 12A of the store transmits, in advance, the order information including the types of the print product materials, the number of images, and the capacity of the image data included in the order data of the current order to the image server 24A (step S32). Immediately before a timing of moment, the transmission of the image data included in the order data of the current order from the store to the cloud is not started.

That is, the order information of the current order is transmitted from the product order IoT device 12A to the management server (not shown) via the hub 14C, the Linux appliance 14B, the broadband router 14A, the network 36A, and the VPN server 20B on the cloud, and is managed by the management server.

Subsequently, the image server 24A acquires the target finish time of the print product corresponding to the types of the print product materials included in the order data of the current order from the product material information DB 24C. The image server 24A acquires the operation logs of the usage statuses of the bandwidths of the network 36A in the store and the print laboratory from the operation log DB 24D, and acquires the transfer status of the preceding data and the transfer priority from the image transfer queue 24B.

Subsequently, as the determination condition of the transfer priorities, the image server 24A determines the transmission priority of the order data of the current order over the preceding data of the preceding order based on the order information including the types of the print product materials, the number of images, and the capacity of the image data included in the order data of the current order, the target finish time of the print product corresponding to the types of the print product materials included in the order data of the current order, the operation logs of the usage statuses of the bandwidths of the network 36 in the store and the print laboratory, and the transfer status and the transfer priority of the preceding data (step S33).

As a result, in a case where there is no preceding data being transferred (No in step S34), the transmission priority of the order data of the current order is the highest.

Accordingly, the image server 24A controls the transfer of the image data by the product order IoT device 12A of the store, and the product order IoT device 12A starts the transmission of the order data of the current order. The transfer status and the transfer priority are recorded in the image transfer queue 24B.

That is, the order data of the current order is transmitted from the product order IoT device 12A to the image server 24A on the cloud (step S35).

On the other hand, in a case where there is the preceding data being transferred (Yes in step S34), the image server 24A performs the control of changing the transfer priority.

In a case where the condition of changing the transfer priority is satisfied, that is, in a case where the transfer priority of the preceding data is lower than the transmission priority of the order data of the current order and the usage status of the bandwidth of the network 36A due to the transfer of the preceding data is equal to or greater than the predetermined threshold value (Yes in step S36), the image server 24A changes the transmission priorities such that the transfer of the preceding data is interrupted and the transmission of the order data of the current order is started (step S37).

In a case where the transfer priorities are changed, the image server 24A updates the transfer status and the transfer priority of the preceding data stored in the image transfer queue 24B, including the order data of the current order as new preceding data.

Accordingly, the image server 24A controls the transfer of the image data by the product order IoT device 12A of the store and the DIC 32A of the print laboratory according to the transfer priority.

As a result, the transfer of the preceding data is interrupted, and the product order IoT device 12A starts the transmission of the order data of the current order (step S38).

On the other hand, in a case where the condition of changing the transfer priority is not satisfied, that is, in a case where the transfer priority of the preceding data is higher than the transmission priority of the order data of the current order or in a case where the usage status of the bandwidth of the network 36A due to the transfer of the preceding data is less than the predetermined threshold value (No in step S36), the image server 24A does not change the transfer priorities (step S39).

In a case where it is determined that the transmission priority of the order data of the current order and the transfer priority of the preceding data are the same priority, the image server 24A determines the transfer priorities so as to be the same as the sequences in which the orders are performed.

Accordingly, the image server 24A controls the transfer of the image data by the product order IoT device 12A of the store and the DIC 32A of the print laboratory according to the transfer priority.

As a result, the transfer of the preceding data is continued, and the product order IoT device 12A starts the transmission of the order data of the current order, for example, after the transfer of the preceding data is completed (step S40).

Subsequently, the image server 24A stores the image data included in the order data received from the product order IoT device 12A in the image DB 22C.

Subsequently, the editing server 22A and the composition server 22B create the product data (current data) of the print product corresponding to the order data of the current order based on the print product materials included in the order data of the current order and the image data stored in the image DB 22C.

Subsequently, the image server 24A stores the product data created by the editing server 22A and the composition server 22B in the image DB 22C.

Figure 7:
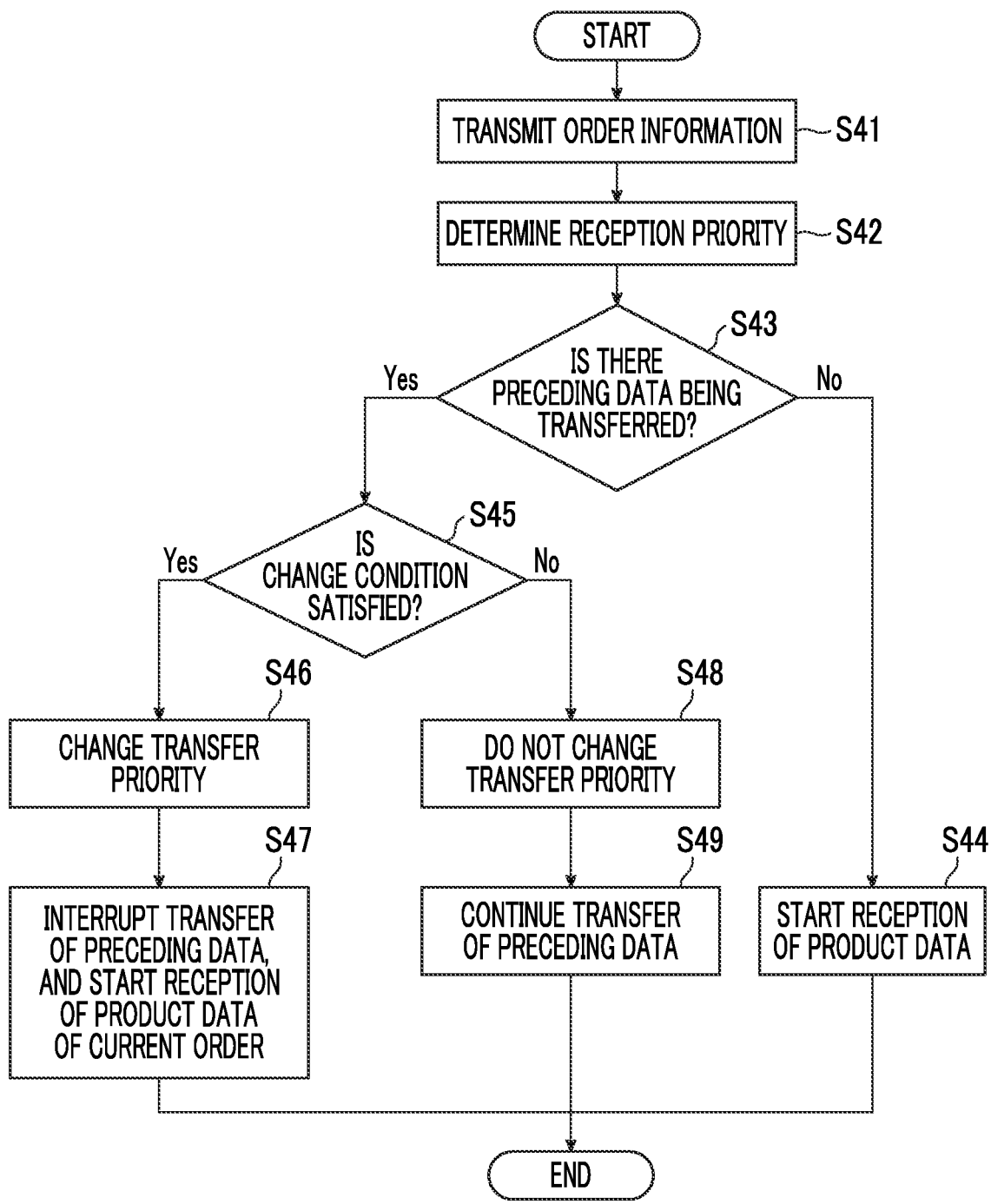
FIG. 7 is a flowchart of an embodiment showing an operation in a case where the product data is received in the image processing apparatus shown in FIG. 5.

Next, a case where the product data of the current order is received from the cloud to the store or the print laboratory will be described with reference to the flowchart shown in FIG. 7.

First, the management server (not shown) transmits, in advance, the order information including the print location of the print product corresponding to the order data of the current order, the number of images, and the capacity of the image data to the image server 24A (step S41). Immediately before a timing of moment, the reception of the product data of the current order from the cloud from the store or the print laboratory is not started.

Subsequently, the image server 24A acquires the target finish time of the print product from the product material information DB 24C, acquires the operation log of the usage status of the bandwidth of the network 36A from the operation log DB 24D, and acquires the transfer status and the transfer priority of the preceding data from the image transfer queue 24B.

Subsequently, the image server 24A determines the reception priority of the product data of the current order over the preceding data of the preceding order based on the determination condition of the transfer priorities (step S42).

As a result, in a case where there is no preceding data being transferred (No in step S43), the reception priority of the product data for the current order is the highest.

Accordingly, the image server 24A controls the transfer of the image data by the order management IoT device 16A of the store, and the order management IoT device 16A starts the reception of the product data of the current order.

That is, the product data of the current order is received from the composition server 22B to the order management IoT device 16A via the virtual network 20A, the VPN server 20B, the network 36A, the broadband router 14A, the Linux appliance 14B, and the hub 14C (step S44).

On the other hand, in step S43, in a case where there is the preceding data being transferred (Yes in step S43), the image server 24A performs the control of changing the transfer priority.

In a case where the condition of changing the transfer priority is satisfied, that is, in a case where the transfer priority of the preceding data is lower than the reception priority of the product data of the current order and the usage status of the bandwidth of the network 36A due to the transfer of the preceding data is equal to or greater than the predetermined threshold value (Yes in step S45), the image server 24A changes the transfer priorities such that the transfer of the preceding data is interrupted and the reception of the product data of the current order is started (step S46).

In a case where the transfer priorities are changed, the image server 24A updates the transfer status and the transfer priority of the preceding data stored in the image transfer queue 24B.

Accordingly, the image server 24A controls the transfer of the image data by the order management IoT device 16A of the store and the DIC 32A of the print laboratory according to the transfer priority.

As a result, the transfer of the preceding data is interrupted, and the order management IoT device 16A or the DIC 32A starts the reception of the product data of the current order (step S47).

On the other hand, in a case where the condition of changing the transfer priority is not satisfied, that is, in a case where the transfer priority of the preceding data is higher than the reception priority of the product data of the current order or in a case where the usage status of the bandwidth of the network 36A due to the transfer of the preceding data is less than the predetermined threshold value (No in step S45), the image server 24A does not change the transfer priorities (step S48).

Similarly, in a case where it is determined that the reception priority of the product data of the current order and the transfer priority of the preceding data are the same priority, the image server 24A determines the transfer priorities so as to be the same as the sequences in which the orders are performed.

Accordingly, the image server 24A controls the transfer of the image data by the order management IoT device 16A and the DIC 32A of the print laboratory according to the transfer priority.

As a result, the transfer of the preceding data is continued, and the order management IoT device 16A or the DIC 32A starts the reception of the product data of the current order after the transfer of the preceding data is completed, for example (step S49).

Here, in a case where the print location is the store, the composition server 22B transmits the product data to the order management IoT device 16A of the store via the network 36A.

That is, the product data is received from the composition server 22B on the cloud to the order management IoT device 16A via the virtual network 20A, the VPN server 20B, the network 36A, and the broadband router 14A, the Linux appliance 14B, and the hub 14C of the store.

Subsequently, the order management IoT device 16A causes the network printer 18A or the USB printer 18B to print the print product corresponding to the product data received from the composition server 22B under the control of the printer driver 16B.

On the other hand, in a case where the print location is the print laboratory, the composition server 22B transmits the product data to the DIC 32A of the print laboratory via the network 36A.

That is, the product data is received from the composition server 22B on the cloud to the DIC 32A via the virtual network 20A, the VPN server 20B, the network 36A, and the VPN router 30A and the hub 30B of the print laboratory.

Subsequently, the DIC 32A and the PC 32B cause the network printer 34A or the gelatin silver printer 34B to print the print product corresponding to the product data received from the composition server 22B.

In the image processing apparatus of the related art that creates the print product, as described above, the transfer priority is controlled for only one of download and upload regardless of the usage status of the bandwidth of the network. On the other hand, in the image processing apparatus according to the embodiment of the present invention, the finish time of the print product can be significantly shortened by controlling the transfer priority for both download and upload based on the usage status of the bandwidth of the network and dynamically changing the bandwidth of the network.

In the image processing apparatus of the related art, although the transfer priority is controlled only for one of the store or the print laboratory, in the present invention, the transfer priority can be controlled both between the store and the cloud and between the print laboratory and the cloud.

In the apparatus according to the embodiment of the present invention, for example, a hardware configuration of a processing unit that executes various tasks of processing of the order receiving unit 12, the store-side transfer unit 14, and the order management unit 16 of the store, the cloud-side transfer unit 20, the order processing unit 22, the priority determination unit 24, the transfer sequence change unit 26, and the transfer controller 28 on the cloud, the print-laboratory-side transfer unit 30 and the print management unit 32 of the print laboratory, and the like may be dedicated hardware, or may be various processors or computers that execute programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of the various processors is an electric circuitry obtained by combining circuit elements such as semiconductor elements.

For example, the method according to the embodiment of the present invention can be implemented by a program causing a computer to execute steps. It is possible to provide a computer-readable recording medium having recorded thereon the program.

While the present invention has been described in detail, the present invention is not limited to the embodiment, and may be modified and changed in various manners without departing the gist of the present invention.

EXPLANATION OF REFERENCES 10, 10A: image processing apparatus
12: order receiving unit
12A: product order IoT device
12B: USB media reader
14: store-side transfer unit
14A: broadband router
14B: Linux appliance
14C: hub
16: order management unit
16A: order management IoT device
16B: printer driver
18: store-side printer
18A: network printer
18B: USB printer
20: cloud-side transfer unit
20A: virtual network
20B: VPN server
22: order processing unit
22A: editing server
22B: composition server
22C: image DB
24: priority determination unit
24A: image server
24B: image transfer queue
24C: product material information DB
24D: operation log DB
26: transfer sequence change unit
28: transfer controller
30: print-laboratory-side transfer unit
30A: VPN router
30B: hub
32: print management unit
32A: DIC
32B: PC
34: print-laboratory-side printer
34A: network printer
34B: gelatin silver printer
36: network

What is claimed is:

1. An image processing apparatus comprising:
a first processor; and
a second processor,
wherein the first processor receives, as an input, order data including a print product material and image data of an image to be applied to the print product material, and
the second processor
creates product data of a print product in which the image data is applied to the print product material based on the order data received from the first processor via a network,
determines a transfer priority of current data including product data or order data of a current order over preceding data including product data or order data of a preceding order based on a determination condition of transfer priorities,
performs control such that the preceding data and the current data are transferred according to the transfer priorities, and
changes the transfer priorities such that the transfer of the preceding data is interrupted and the transfer of the current data is started in a case where a transfer priority of the preceding data is lower than the transfer priority of the current data and a usage status of a bandwidth of the network due to the transfer of the preceding data is equal to or greater than a predetermined threshold value.

2. The image processing apparatus according to claim 1, wherein the second processor determines the transfer priority of the current data over the preceding data based on a type of the print product material, the number of images, and a capacity of the image data included in the current data, a target finish time of the print product set for each type of the print product materials, operation logs of usage statuses of bandwidths of the network in a store and a print laboratory, and a transfer status and the transfer priority of the preceding data.

3. The image processing apparatus according to claim 2, wherein the second processor further determines the transfer priorities such that a transfer priority of order data or product data corresponding to a print product printed by a printer of the store is higher than a transfer priority of order data or product data corresponding to a print product printed by a printer of the print laboratory.

4. The image processing apparatus according to claim 3, wherein the second processor determines the transfer priorities such that a transfer priority of order data or product data corresponding to a print product for a first target finish time is higher than a transfer priority of order data or product data corresponding to a print product for a second target finish time longer than the first target finish time.

5. The image processing apparatus according to claim 3, wherein the second processor further determines the transfer priorities such that, among print products printed by a printer of the print laboratory, a transfer priority of product data corresponding to a print product directly delivered to the store or a user from the print laboratory is higher than a transfer priority of product data corresponding to a print product forwarded to a delivery base from the print laboratory and delivered to the store or the user from the delivery base.

6. The image processing apparatus according to claim 3, wherein the second processor further determines the transfer priorities such that, among print products printed by a printer of the print laboratory, a transfer priority of order data or product data corresponding to a print product for which a speedy-finishing is designated is higher than a transfer priority of order data or product data corresponding to a print product for which the speedy-finishing is not designated.

7. The image processing apparatus according to claim 3, wherein the second processor determines the transfer priorities so as to be the same as sequences in which orders are performed in a case where it is determined that the transfer priority of the current data and the transfer priority of the preceding data are the same priority.

8. The image processing apparatus according to claim 2, wherein the second processor determines the transfer priorities such that a transfer priority of order data or product data corresponding to a print product for a first target finish time is higher than a transfer priority of order data or product data corresponding to a print product for a second target finish time longer than the first target finish time.

9. The image processing apparatus according to claim 2, wherein the second processor further determines the transfer priorities such that, among print products printed by a printer of the print laboratory, a transfer priority of product data corresponding to a print product directly delivered to the store or a user from the print laboratory is higher than a transfer priority of product data corresponding to a print product forwarded to a delivery base from the print laboratory and delivered to the store or the user from the delivery base.

10. The image processing apparatus according to claim 2, wherein the second processor further determines the transfer priorities such that, among print products printed by a printer of the print laboratory, a transfer priority of order data or product data corresponding to a print product for which a speedy-finishing is designated is higher than a transfer priority of order data or product data corresponding to a print product for which the speedy-finishing is not designated.

11. The image processing apparatus according to claim 2, wherein the second processor determines the transfer priorities so as to be the same as sequences in which orders are performed in a case where it is determined that the transfer priority of the current data and the transfer priority of the preceding data are the same priority.

12. The image processing apparatus according to claim 2, wherein the second processor further determines the transfer priorities such that a transfer priority of order data or product data corresponding to a print product printed by a waiting printer is higher than a transfer priority of order data or product data corresponding to a print product printed by an operating printer based on operation logs of usage statuses of printers of the store.

13. The image processing apparatus according to claim 2, wherein the second processor determines the transfer priorities such that a transfer priority of order data or product data corresponding to a first print product material for which the number of prints with respect to the number of images transferred is larger than a second print product material is higher than a transfer priority of order data or product data corresponding to the second print product material.

14. The image processing apparatus according to claim 2, wherein the second processor further determines the transfer priorities such that a transfer priority of order data or product data corresponding to a third print product material for which the number of orders in a specific period is larger than a fourth print product material is higher than a transfer priority of order data or product data corresponding to the fourth print product material.

15. The image processing apparatus according to claim 2, wherein the second processor determines the transfer priorities such that a transfer priority of order data or product data corresponding to a print product printed by a printer of the print laboratory is the lowest in a specific time zone of a current specific day of the week in a case where a usage status of a bandwidth of the network in a specific time zone of a past specific day of the week is equal to or greater than a threshold value based on an operation log of the usage status of the bandwidth of the network in the specific time zone of the past specific day of the week.

16. The image processing apparatus according to claim 1, wherein the second processor divides the image data and transfers the divided image data in at least one of a case where a capacity of the image data is equal to or greater than a threshold value or a case where a delay time of the network is equal to or greater than a threshold value.

17. The image processing apparatus according to claim 1, wherein the second processor determines an upper limit of the bandwidth of the network used at a time of transferring the image data and transferring the image data in a case where a capacity of the image data is equal to or greater than a threshold value.

18. An image processing method comprising:
a step of receiving, by an order receiving unit, as an input, order data including a print product material and image data of an image to be applied to the print product material;
a step of creating, by an order processing unit, product data of a print product in which the image data is applied to the print product material based on the order data received from the order receiving unit via a network;
a step of determining, by a priority determination unit, a transfer priority of current data including product data or order data of a current order over preceding data including product data or order data of a preceding order based on a determination condition of transfer priorities;
a step of performing, by a transfer controller, control such that the preceding data and the current data are transferred according to the transfer priorities; and
a step of changing, by a transfer sequence change unit, the transfer priorities such that the transfer of the preceding data is interrupted and the transfer of the current data is started in a case where a transfer priority of the preceding data is lower than the transfer priority of the current data and a usage status of a bandwidth of the network due to the transfer of the preceding data is equal to or greater than a predetermined threshold value.

19. A program causing a computer to execute the steps of the image processing method according to claim 18.

20. A computer-readable recording medium having recorded thereon a program causing a computer to execute the steps of the image processing method according to claim 18.

* * * * *